United States Patent
Sutinen et al.

(10) Patent No.: US 6,839,564 B2
(45) Date of Patent: Jan. 4, 2005

(54) SYNCHRONIZATION OF DATABASE DATA

(75) Inventors: Ari Sutinen, Tampere (FI); Riku Mettälä, Tampere (FI); Jussi Piispanen, Tampere (FI); Mikko Sahinoja, Tampere (FI)

(73) Assignee: Nokia Corporation, Espoo (FI)

( * ) Notice: Subject to any disclaimer, the term of this patent is extended or adjusted under 35 U.S.C. 154(b) by 624 days.

(21) Appl. No.: 09/842,568

(22) Filed: Apr. 25, 2001

(65) Prior Publication Data

US 2002/0161769 A1 Oct. 31, 2002

(51) Int. Cl.⁷ ............................................... H04B 15/00
(52) U.S. Cl. ..................... 455/502; 455/466; 455/13.2; 707/10; 707/8
(58) Field of Search ................................ 456/502, 466, 456/13.2, 555, 556.1, 557, 410; 707/8, 201, 200, 10

(56) References Cited

U.S. PATENT DOCUMENTS

| 5,307,487 | A |   | 4/1994  | Tavares et al. ............. 395/650 |
|-----------|---|---|---------|-------------------------------------|
| 5,608,720 | A | * | 3/1997  | Biegel et al. ............... 370/249 |
| 5,710,772 | A |   | 1/1998  | Sato .......................... 370/458 |
| 5,710,922 | A |   | 1/1998  | Alley et al. ................ 395/617 |
| 5,943,676 | A | * | 8/1999  | Boothby ...................... 707/201 |
| 6,173,311 | B1| * | 1/2001  | Hassett et al. ............. 709/202 |
| 6,266,525 | B1| * | 7/2001  | Peterson ..................... 455/410 |
| 6,490,617 | B1| * | 12/2002 | Hemphill et al. ........... 709/223 |
| 6,516,314 | B1| * | 2/2003  | Birkler et al. ................. 707/8 |
| 6,622,083 | B1| * | 9/2003  | Knockeart et al. .......... 701/202 |
| 6,643,669 | B1| * | 11/2003 | Novak et al. ................ 707/201 |
| 6,654,785 | B1| * | 11/2003 | Craig ......................... 709/203 |

FOREIGN PATENT DOCUMENTS

| EP | 1024441 A2   | 8/2000 |
| WO | WO 98/24018  | 6/1998 |
| WO | WO 00/29998  | 5/2000 |
| WO | WO 01/69435 A2 | 9/2001 |

OTHER PUBLICATIONS

"SyncML Sync Protocol", version 1.0, 2000, 60 page document.

* cited by examiner

Primary Examiner—Quochien B. Vuong
Assistant Examiner—Tan Trinh
(74) Attorney, Agent, or Firm—Perman & Green, LLP

(57) ABSTRACT

A method of arranging synchronization of databases, the method comprising the steps of establishing a transport layer connection for synchronization between a first and a second device which synchronize databases. During initialization of synchronization a first update identifier, which is stored at least in the first device and describes the latest synchronization event the devices have performed in the databases, and a second update identifier, which is defined by the first device and describes the present synchronization, are transmitted from the first device to the second device. The second update identifier is stored in the first and the second device. The contents of the first update identifiers stored in the devices are updated in the first and the second device if synchronization has been performed and after this said transport layer connection has been ended substantially properly.

13 Claims, 5 Drawing Sheets

SYNCHRONIZATION OF DATABASE DATA

BACKGROUND OF THE INVENTION

The invention relates to synchronization of database data in a telecommunications system, particularly to maintenance of data on synchronization events. Data synchronization is a function where at least two data collections are made similar to each other so that the data units of the data collections substantially correspond to each other after synchronization.

Data of portable terminals, such as portable computers, PDA devices (Personal Digital Assistant), mobile stations or pagers, can be synchronized with network applications, applications of desktop computers or with other databases of the telecommunications system. In particular, data of calendar and e-mail applications are typically synchronized. EP 1 024 441 discloses a method of synchronizing databases. The method comprises maintaining data on the time the database has transmitted records to another database (transmission time), the time the database has received records from another database (reception time) and the time each record in the database has been modified (modification time). A record is transmitted from the first database to the second database only if the record modification time is later than the transmission time and the modification time is earlier than the reception time.

Synchronization has been based on the use of different manufacturer-specific protocols which are incompatible. This restricts the use of terminal or data types and often causes troubles to the user. In mobile communication, in particular, it is important that data can be retrieved and updated regardless of the terminal and application used.

To improve synchronization of application data, a language known as Synchronized Markup Language SyncML, which is based on the XML (Extensible Markup Language), has been developed. Using a SyncML synchronization protocol, which employs messages in the SyncML format, data of any application can be synchronized between networked terminals of any kind. The SyncML synchronization protocol functions both in wireless and in fixed networks and supports several transmission protocols.

FIG. 1 shows an example of synchronization where a mobile station MS functions as the SyncML client terminal and a network server S functions as the SyncML server. The SyncML synchronization service comprises first initializing a synchronization session during which e.g. the database to be synchronized is selected. The SyncML client terminal MS comprises a sync client agent which implements the SyncML protocol and sends a SyncML message (Client Modifications), which includes at least the data which are to be synchronized in the mobile station MS and have changed since the last synchronization. The SyncML server S comprises a sync server agent, which controls synchronization, and a synchronization block (Sync Engine). The server usually waits for an initiative for synchronization from the SyncML client (MS). The server S synchronizes the data, i.e. analyses the changes made to the database and client terminal data, and harmonizes it (makes necessary modifications, replacements and deletions). After this, the SyncML server S sends the server modifications back to the SyncML client (MS). The example described above is simple; yet it illustrates the roles of the devices according to the SyncML standard. The SyncML client terminal (MS) is typically a mobile station (MS), a PC (Personal Computer), a laptop, or a PDA device. The SyncML server S is typically a network server or a PC.

The system according to the SyncML standard employs 'synchronization anchors' associated with databases. These are strings which describe a synchronization event in terms of the date and time, for example. The synchronization anchors used are called the 'Last' anchor and the 'Next' anchor, of which the Last anchor represents the last event when the database was synchronized in respect of the transmitting device and the Next anchor represents the present synchronization event in respect of the transmitting device. The devices transmit their anchors to each other during initialization of a synchronization session so that the Next anchor can be stored after a successful synchronization session. During the next synchronization the device can compare the Next anchor stored with the Last anchor received, and if they match, the device notes that no errors have occurred since the last synchronization. If the anchors do not match, it is necessary to perform slow synchronization, for example, where all data units in the databases have to be compared with one another. In practice, in slow synchronization the client terminal transmits all data from the database to be synchronized to the SyncML server, which analyses field by field the data it has received and the data of another database to be synchronized, or alternatively replaces all the data of the other database to be synchronized with the data it has received. In standard SyncML Sync Protocol, version 1.0, December 2000, which defines the SyncML synchronization protocol, it is stated that the synchronization anchors must not be updated until the synchronization session has finished.

FIG. 2 illustrates use of synchronization anchors. In this example the SyncML client (MS) and the SyncML server (S) synchronize twice (synchronization sessions 1 and 2). The anchor (9.9.2001, 09:09:09 AM) of the preceding synchronization session (which precedes synchronization session 1) related to the same databases is stored in the synchronization server S. This anchor was the contents of the Next anchor of the preceding synchronization session and was stored as the Last anchor for the first synchronization session 1. The client MS initiates synchronization session 1 on 10 Oct. 2001 at 10:10:10 AM. This time will be the Next anchor for synchronization session 1. The MS transmits the Last anchor stored in it and the Next anchor to the server S. During synchronization session 1 it is unnecessary to initiate slow synchronization because the Last synchronization anchors match, i.e. the Last anchor (9.9.2001, 09:09:09 AM) in the memory of the S corresponds to the Last anchor received. After the server S has transmitted an acknowledgement (OK), data can be synchronized. The acknowledgement is preferably an initialization message, which also comprises the Last and the Next anchor. After synchronization session 1 has finished, the S replaces the preceding Last anchor (9.9.2001, 09:09:09 AM) with the contents of the Next anchor (10.10.2001, 10:10:10 AM) in its memory. A transport failure occurs in the example, i.e. the MS does not update the Last anchor to its memory. The transport failure can be an error in the transmission connection, for example. The S can also disconnect the connection immediately after it has received a synchronization message, but the SyncML client can still remain waiting for an acknowledgement from the server. In that case disconnection is a transport failure from the SyncML client's point of view. During initialization of the second synchronization session the MS transmits a non-updated Last anchor (9.9.2001, 09:09:09 AM) and a Next anchor (11.11.2001, 11:11:11 AM) to the server S. The S notes that the Last anchors do not match, and thus it requests refresh, typically slow synchronization.

The problem related to the SyncML standard is that the update moment of the update identifiers which describe synchronization (synchronization anchor in the SyncML, e.g. a time stamp) has not been defined accurately. Depending on the manufacturer's application, some devices may update the identifier as soon as synchronization messages have been sent, whereas others perform this after the connection used for the synchronization session has been disconnected. As described in the example of FIG. 2, some devices do not necessarily update the identifier in an error situation, as a result of which slow synchronizations are performed needlessly. Slow synchronizations are particularly undesirable for the user because they take a lot of time and typically cause additional data transmission costs. The user may also think that synchronization failed because slow synchronization takes so much time.

BRIEF DESCRIPTION OF THE INVENTION

The object of the invention is to avoid the problem described above and provide as uniform function as possible in the devices that participate in synchronization. The objects of the invention are achieved with a method, a synchronization system, a synchronization device, a telecommunications device and computer programs which are characterized by what is disclosed in the independent claims. The preferred embodiments of the invention are disclosed in the dependent claims.

The invention is based on updating in a first device and in a second device the contents of first update identifiers, which describe the preceding synchronization and are stored in the devices, with the contents of a second update identifier, which describes the present synchronization, if synchronization has been performed and after this the transport layer connection established for synchronization has been ended substantially properly. The transport layer generally refers to a layer which provides the synchronization application layer with a reliable logical data transmission connection (not necessarily a protocol of the transport layer according to the OSI model, such as TCP). The transport layer connection has been ended properly when the handshaking related to ending of a connection has been performed according to the steps defined in the transport layer standard, after which the devices do not wait for any transport layer messages from each other. The updated contents of the update identifier are used in the next synchronization event.

The term 'database' is to be understood broadly as referring to a data collection of any data source or data storage that can be updated by one or more applications. The update identifier is any identifier that is associated with a synchronization event of databases, typically a sequence number or a time stamp. The fist update identifier always represents the synchronization event that precedes the present synchronization event. Update can be performed by replacing an earlier value with a new value or by using a sequential solution, i.e. by adding a new value to the earlier values, after which the newest value is always logically the first update identifier in the next synchronization event.

The arrangement of the invention has the advantage that the devices which support the invention always update the update identifiers substantially simultaneously, which allows to minimize unnecessary slow synchronizations and avoid the disadvantages related to them. Using the timing according to the invention, it can be ensured in a reliable manner that the devices participating in synchronization always either update the update identifiers or not.

According to a preferred embodiment of the invention, synchronization is based on the synchronization protocol according to the SyncML standard, and thus the first update identifier is the Last anchor of synchronization and the second update identifier is the Next anchor.

BRIEF DESCRIPTION OF THE DRAWINGS

The invention will be described in greater detail by means of preferred embodiments with reference to the accompanying drawings, in which.

DETAILED DESCRIPTION OF THE INVENTION

In the following, the preferred embodiment of the invention will be described in a system supporting the SyncML standard without limiting the invention thereto.

Figure 3:
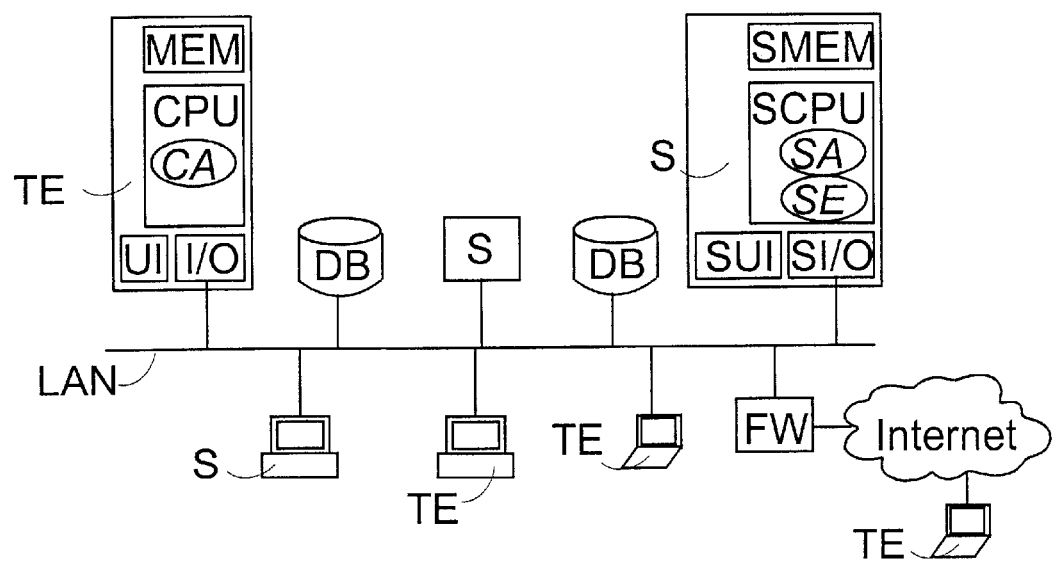
FIG. 3 illustrates a wireless network and a local area network.
Figure 3:
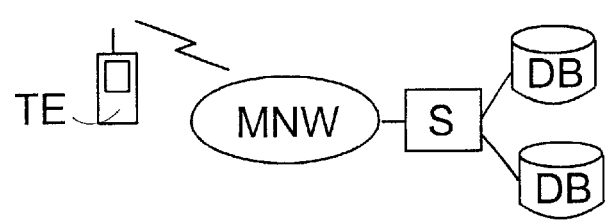

FIG. 3 illustrates a networked system where data of databases DB and terminals TE can be synchronized. In respect of synchronization the terminal TE functions as a client device. FIG. 3 shows two examples. In the first one there are terminals TE, databases DB and synchronization servers S connected to a local area network LAN. The terminal TE connected to the network LAN comprises a functionality for communicating with the devices of the network LAN, e.g. a network card and software which controls data transmission. The local area network LAN can be a local area network of any type and the TE can also communicate with the server S via the Internet, typically using a firewall FW. In the second example a terminal TE, a synchronization server S and databases DB are connected to a mobile network MNW. The terminal TE connected to the network MNW comprises a mobile station functionality for communicating wirelessly with the network MNW. The mobile network MNW can be any prior art wireless network, such as a network which supports the GSM service, a network which supports the GPRS service (General Packet Radio Service), a third-generation mobile communication network, such as a UMTS network (Universal Mobile Telecommunications System), a wireless local area network WLAN or a private network. It should be noted that the server S can also function as a database DB, even though in FIG. 3 the servers S and the databases DB are shown separately for the sake of clarity.

Figure 4:
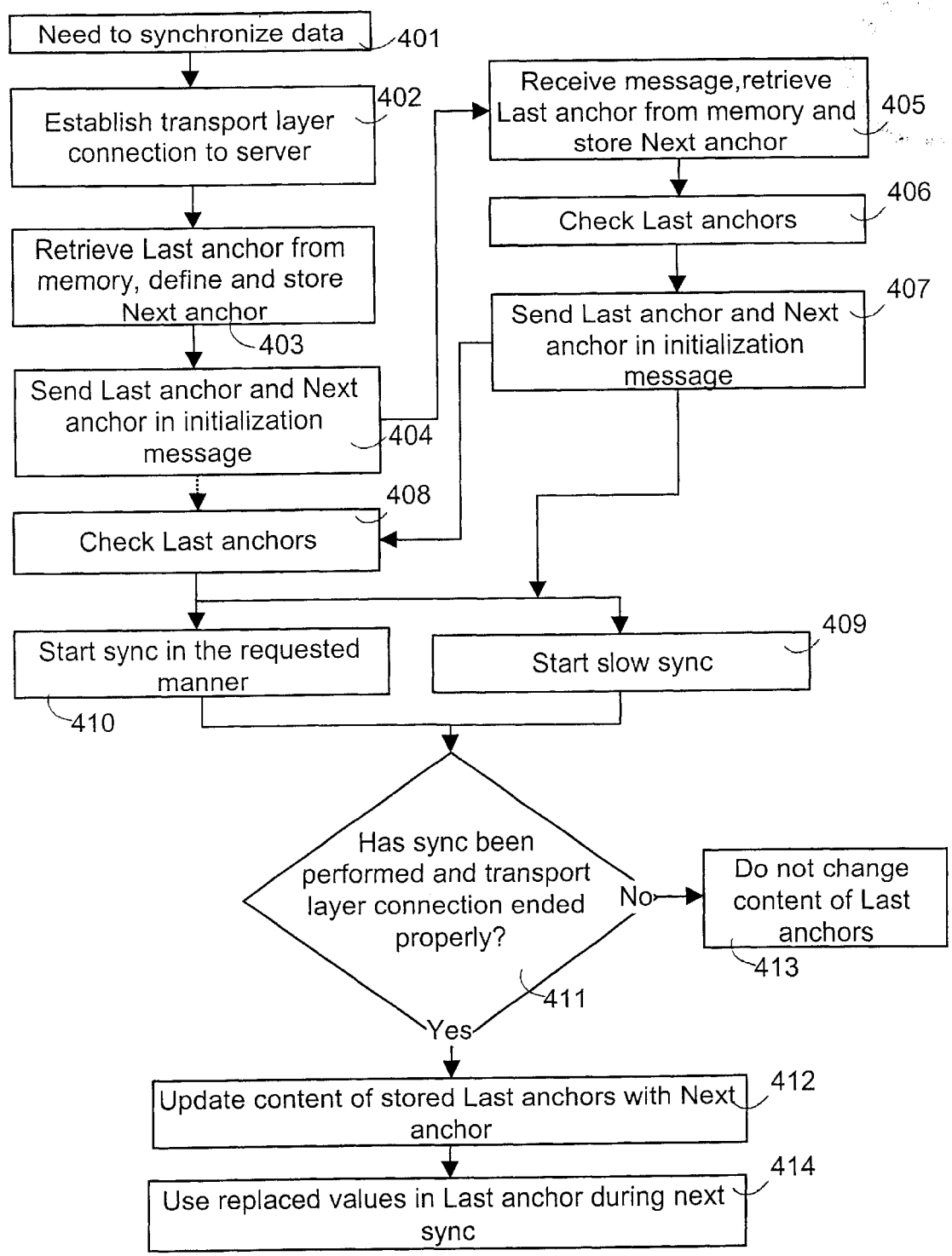
FIG. 4 illustrates a method according to a preferred embodiment of the invention.
Figure 5:
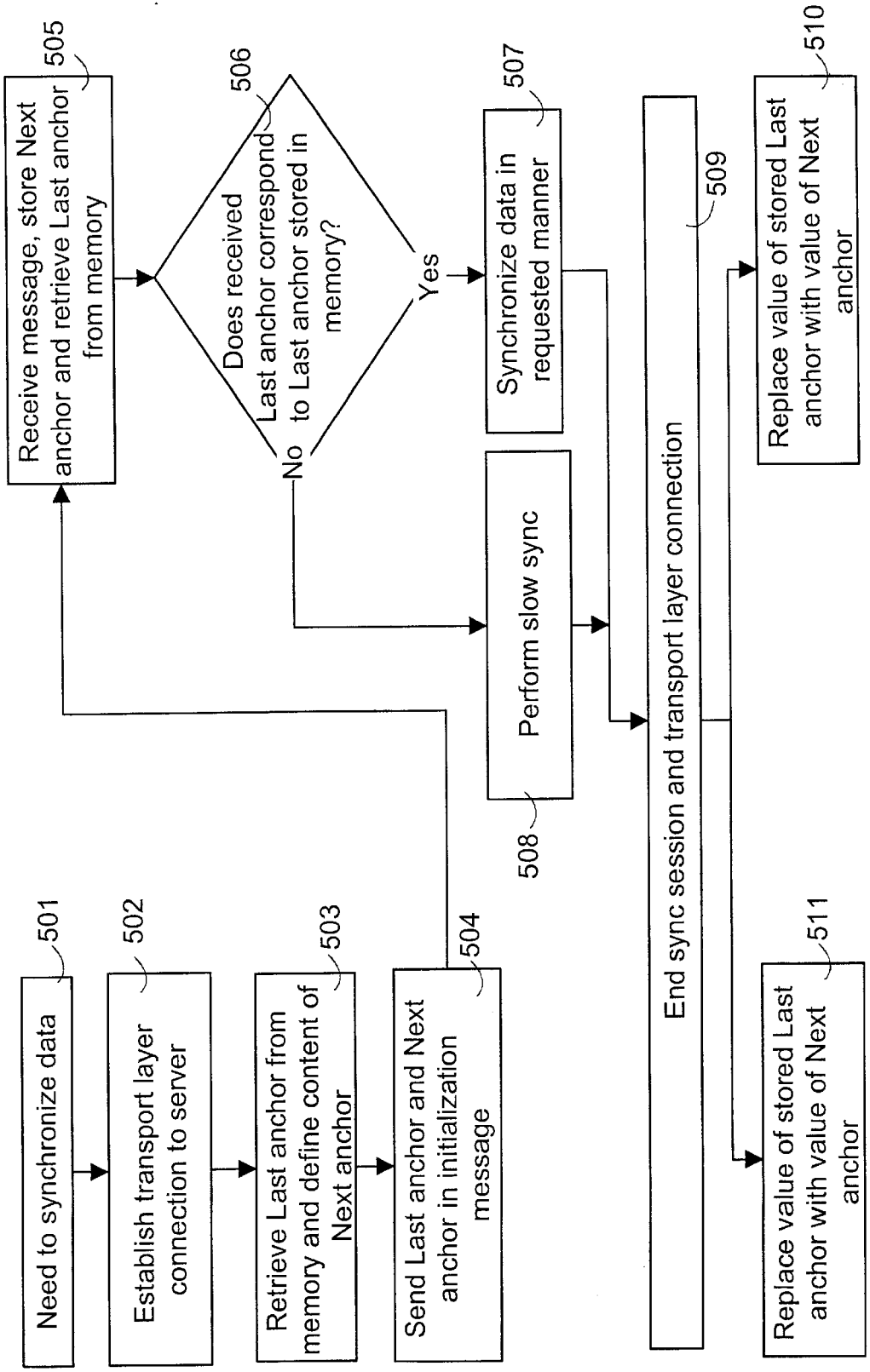
FIG. 5 illustrates a method according to another preferred embodiment of the invention.

The terminals TE (in wired networks LAN and in wireless networks MNW) and the servers comprise memory MEM; SMEM, a user interface UI; SUI, I/O means I/O; SI/O for arranging data transmission and a central processing unit CPU; SCPU which comprises one or more processors. The memory MEM; SMEM includes a non-volatile portion of the central processing unit CPU; SCPU for storing controlling applications and a random access memory portion for data processing. The memory MEM of the TE (which in this example is the database to be synchronized) and the memory of the databases DB store application data which are to be synchronized. A client agent SA operating according to the invention is preferably implemented by running a computer program code stored in the memory MEM in the CPU. The synchronization server S also provides a synchronization agent SA and a synchronization block SE according to the invention preferably by running a computer program code stored in the memory SMEM in the SCPU. The computer program code executable in the central processing unit CPU and SCPU makes the terminal TE and the synchronization server S implement the inventive means. Embodiments of these means are illustrated in FIGS. 4 and 5. The computer programs can be obtained via the network and/or stored in memory means, such as a floppy disk, CD ROM or other external memory means from which they can be loaded into the memory MEM, SMEM. Integrated circuits can also be used.

FIG. 4 illustrates a synchronization method according to an embodiment of the invention where the terminal TE initiates synchronization with the server S. When there is need 401 to synchronize data of the databases (e.g. MEM, DB), a transport layer connection is established 402 between the server S and the TE. The TE retrieves 403 the Last anchor updated after the preceding synchronization session from its memory MEM and defines 403 a Next anchor, e.g. checks the date and time. The Last and Next anchors are typically sequence numbers or time stamps. The anchors are database-specific, i.e. they indicate when the data of the database concerned have been updated. The TE also defines a Next anchor for synchronization and stores it temporarily in the random access memory section of the memory MEM. The TE transmits 404 a client initialization message to the server S. The Alert elements of the message (for each database to be synchronized) comprise a Last anchor and a Next anchor. The client initialization message also informs the synchronization server S of the databases the data of which are to be synchronized and what type of synchronization is to be used. The client initialization message typically also includes authentication information and information on the services and device features supported by the terminal TE.

The server S receives the client initialization message, stores the Next anchor temporarily in the random access memory section of the memory SMEM and retrieves 405 the stored Last anchor from its memory SMEM (which is the contents of the Next anchor of the last/preceding synchronization session stored preferably in the field labelled Last anchor). The S checks 406 the Last anchor received and the Last anchor retrieved from its memory. After 407 the check 406 the server S sends a server initialization message containing the Next anchor (received from the TE) and the Last anchor (from the memory SMEM of the server S) to the terminal TE, too. The server initialization message includes information on whether the time stamps correspond to each other. The TE checks 408 correspondence of the Last anchors by comparing the Last anchor received with the Last anchor stored in the memory MEM.

Figure 1:
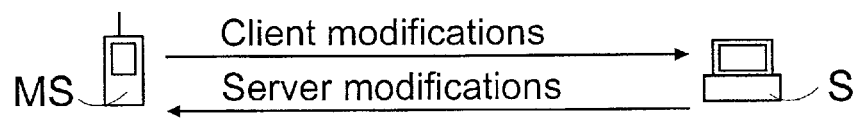
FIG. 1 illustrates synchronization according to the SyncML synchronization protocol.

If both the check 408 carried out by the TE and the check 406 carried out by the S indicate that the Last anchors correspond to each other, synchronization can be initiated 410 in the requested manner, in which case only the data units modified after the Last anchor need to be synchronized. After initialization has been finished, the data of at least one database DB defined in initialization of synchronization and data of the terminal TE can be synchronized. The necessary authentications can be performed (in the case of two-way synchronization) employing SyncML messages illustrated in FIG. 1 (Client Modifications, Server Modifications).

The type of synchronization can be e.g.

Two-way sync

One-way sync from client only

Refresh sync from client only

One-way sync from server only

Refresh sync from server only

Server alerted sync

As regards a more detailed description of the initialization of synchronization session and data synchronization 407, reference is made to the standard SyncML Sync Protocol, version 1.0, December 2000, which defines the SyncML synchronization protocol.

If the Last anchors do not match according to the comparison 406 and/or 408, an error has occurred and all the data of the databases under synchronization need to be synchronized. After the comparison 406 the S can give information on unsuccessful synchronization or more preferably send an initialization message according to which slow synchronization is started 409. The TE can also request slow sync if the Last anchors do not correspond to each other according to the comparison 408.

Next it is checked 411 whether synchronization has been performed and the transport layer connection ended properly. Synchronization has been performed after all the data needed according to the synchronization type have been transferred between the TE and the S (neither has anything to transmit) and neither of the devices waits for an acknowledgement from the other. In the case of two-way synchronization, for example, synchronization has been performed when the server S acknowledges (Map Acknowledgement from Server) to the terminal TE that it has received the modifications made by the TE (Data Update Status Package for Server) and the TE receives the acknowledgement it has been waiting for. The connection has not been ended properly if, for example, the TE or the S receives an error message, an erroneous transport layer message or does not receive the message it is waiting for (in which case the TE/S can send an error message).

The SyncML synchronization protocol can be implemented between the TE and the S on top of the HTTP protocol (Hyper Text Transfer Protocol), the WSP protocol (Wireless Session Protocol) of the WAP standard (Wireless Application Protocol), the OBEX protocol used for cable connections, such as USB (Universal Serial Bus) or RS-232, for short-range radio frequency connections (Bluetooth) or for infrared connections (IrDA), the TCP/IP stack (Transport Control Protocol/Internet Protocol) and on top of the transport layer service which offered by the e-mail protocol (SMTP, Simple Mail Transfer Protocol). Transfer at the lower layer can be performed according to the underlying network using e.g. short messages SMS or other signaling type transmission methods (e.g. USSD; Unstructured Supplementary Service Data), circuit-switched data calls or packet-switched data transfer services.

According to an embodiment, the HTTP protocol is used for providing a transport layer connection. In that case the connection has been ended properly after a 'HTTP request' message of the HTTP protocol, which includes last acknowledgements of the SyncML session, which require no response, and in response to which an acknowledgement message 'HTTP status response' received in the device that transmitted the finish message has been transmitted, has been transferred between the devices. For example, the TE can send a 'HTTP request' message which includes the last message (Data Update Status Package for Server) to which no acknowledgement is required (i.e. synchronization has been performed). The S responds by transmitting a 'HTTP status response' message, after which it can update 412 the contents of the Last anchor. If the TE receives the last correct 'HTTP status response' message (ok in the HTTP header 200) from the server S, it can update 412 the contents of the Last anchor.

According to an embodiment, the OBEX protocol is used to offer the transport layer connection. In that case the connection has been ended properly when a 'disconnect' command in accordance with the OBEX protocol has been transferred between the devices and a 'response' command related to the 'disconnect' command has been transmitted and received.

According to another embodiment, the WSP protocol is used to offer the transport layer connection. In that case the connection has been ended properly if a 'disconnect request' message has been transferred between the devices and a 'disconnect indication' message related to the 'disconnect request' message has been transmitted and received.

The contents of the previous Last anchors are updated 412 in the server S and the terminal TE (the contents can also be zero or empty if the Last anchor has not been stored earlier) with the contents of the Next anchor of the present synchronization session if synchronization has been performed and the transport layer connection has been ended properly. The memory MEM, SMEM preferably includes one record in which the Last anchor is maintained for the next synchronization. It is also possible that the value of the preceding Last anchor is not deleted but update 412 is performed by adding a record with a new value to the memory and by using it in the next synchronization. Thus the values stored in step 412 can be used 414 during the next synchronization, that is to say, the initiating party can send the value stored in the memory as the Last anchor and the receiving party can retrieve the stored value from its memory for comparison.

If synchronization has not been finished and/or the transport layer connection has not been ended properly, the values of the Last anchors stored in the memory are not changed 413 and the Next anchors stored temporarily are rejected.

FIG. 5 illustrates synchronization according to another embodiment of the invention. When there is need 501 to synchronize data, a transport layer connection is established 502 between the server S and the TE. The TE retrieves 503 the Last anchor updated after the preceding synchronization session from its memory MEM and determines 503 a Next anchor. The TE sends 504 to the server S an initialization message of synchronization session which comprises the Last and the Next anchor defined. The S receives the initialization message, stores the Next anchor temporarily and retrieves 505 the stored Last anchor (which is the contents of the Next anchor of preceding synchronization) from its memory SMEM. The S compares 506 the received Last anchor with the Last anchor it has retrieved from its memory. If they correspond to each other, synchronization 507 can be implemented in the manner requested by the TE and only the data units modified after the Last anchor need to be synchronized. In that case the S can send an initialization message to the TE, which indicates that synchronization can be carried out in the requested manner. Even though the S typically always sends the Last and the Next anchors to the TE, the TE does not compare these anchors with the anchors of its own in this embodiment. After initialization has been finished, data of at least one database DB and terminal TE defined in the synchronization initialization can be synchronized.

If the Last anchors do not correspond to each other according to the comparison 506, an error has occurred and the data of all the databases under synchronization need to be synchronized 508. Step 508 is also performed if the data of the databases of the S and the TE have not been synchronized earlier or if the memory MEM, SMEM has been cleared, in which case the Last anchor indicates the value 'empty'. In that case the S can give information on unsuccessful synchronization or preferably send an initialization message according to which slow synchronization is started.

After synchronization (507 or 508) has been performed, the synchronization session and the transport layer connection are ended 509. After this, the contents of the stored Last anchors are updated in the server S 511 and in the terminal TE 510 with the contents of the Next anchor of the present synchronization session if synchronization has been performed and the transport layer connection has been ended properly (cf. step 411, 412).

It should be noted that the functions illustrated in FIGS. 4 and 5 can be utilized in synchronization between more than two devices, in which case the Next and the Last anchors can be transmitted between all devices. The Last anchor is updated with a new value if synchronization has been performed between all the devices and the transport layer connections have been ended properly.

Unlike in FIGS. 4 and 5, synchronization can also be started without separate initialization messages. In that case initialization is performed simultaneously with synchronization. After the synchronization session and the transport layer connection have been ended, the Next anchors of the synchronization session can be updated as the value of the Last anchors in the memory MEM, SMEM, as described above. In that case the number of messages to be sent during synchronization can be reduced.

Figure 2:
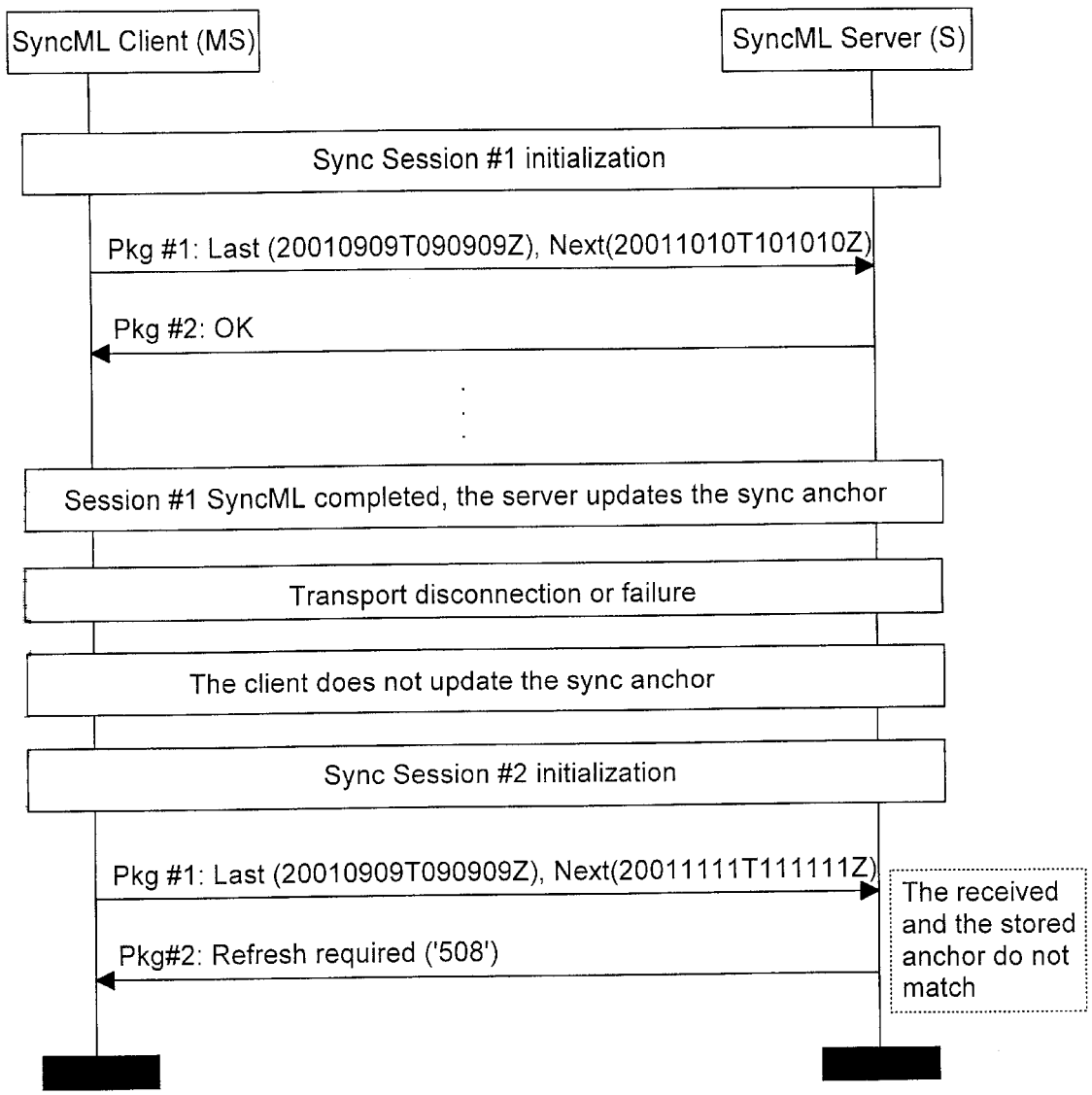
FIG. 2 illustrates use of synchronization anchors.
Figure 6:
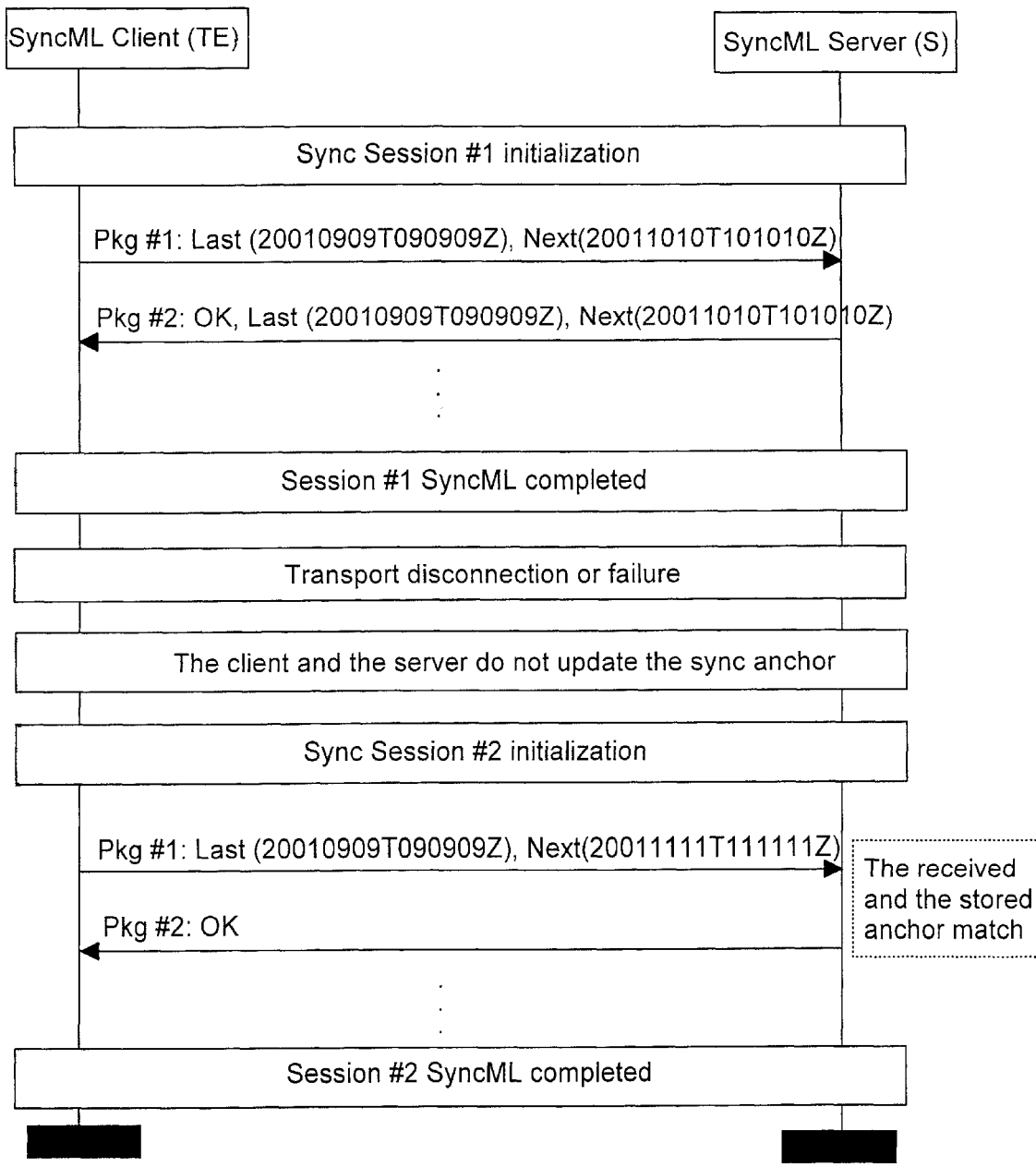
FIG. 6 is a signalling chart illustrating signalling events according to preferred embodiments of the invention.

FIG. 6 illustrates a signaling chart according to an embodiment of the invention, which resembles synchronization illustrated in FIG. 2. Slow synchronization is not needed in synchronization session 1 because the Last synchronization anchors match, i.e. the Last anchor (9.9.2001, 09:09:09 AM) in the memory of the S corresponds to the received Last anchor. After the server S has sent an acknowledgement (OK), data can be synchronized. The acknowledgement is preferably an initialization message which also includes a Last anchor and a Next anchor. After the synchronization session 1 has been finished, a transport failure occurs in the example due to an error in data transmission or due to non-uniform function of the devices (TE waits for an acknowledgement from the server S). According to the invention, neither the terminal TE nor the server S has updated a new value for the Last anchor in its memory. In synchronization session 2 the TE sends 9.10.2001, 09:09:09 AM as the value of the Last anchor. The Last anchor stored in the memory of the server S and the Last anchor received from the terminal TE correspond to each other, and thus synchronization session 2 can be performed without slow synchronization. This allows to avoid slow synchronization due to a transport failure according to the prior art shown in FIG. 2.

It will be obvious to a person skilled in the art that as the technology advances, the inventive concept can be implemented in a number of ways. The invention and its embodiments are thus not limited to the examples described above but may vary within the scope of the claims.

What is claimed is:

1. A method of arranging synchronization of databases, the method comprising the steps of:

establishing a transport layer connection for synchronization between a first and a second device which synchronize databases, transmitting a first update identifier, which is stored at least in the first device and describes the latest synchronization event the first and the second device have performed in the databases, during initialization of synchronization from the first device to the second device, and a second update identifier, which is defined by the first device and describes the present synchronization, storing said second update identifier in the first device and in the second device, and updating the contents of the first update identifiers stored in the devices with the contents of said second update identifier in the first device and in the second device if synchronization has been performed and after this said transport layer connection has been ended substantially properly.

2. A method according to claim 1, which further comprises the steps of:

comparing the first update identifier received in the second device with the first update identifier stored in the second device, performing synchronization in the requested manner if the first received update identifier corresponds to the first stored update identifier, synchronizing all data units of the databases if the first received update identifier does not correspond to the first stored update identifier.

3. A method according to claim 2, which further comprises the steps of:

transmitting the first stored update identifier from the second device to the first device, comparing also the first received update identifier with the first stored update identifier in the first device.

4. A method according to claim 1, wherein the update identifiers indicate the date and time.

5. A method according to claim 1, wherein the first update identifier being the Last anchor of synchronization and the second update identifier the Next anchor.

6. A method according to claim 1, wherein said transport layer connection is a logical connection in accordance with the HTTP protocol, and said transport layer connection has been ended properly if a 'HTTP request' message has been transferred between the first device and the second device after synchronization and a 'HTTP status response' message related to the 'HTTP request' message has been transmitted and received.

7. A synchronization system for synchronizing databases comprising a first device and a second device which perform synchronization and are arranged to establish a transport layer connection between the first device and the second device for performing synchronization, transmit a first update identifier, which is stored at least in the first device and describes the latest synchronization event the first and the second device have performed in the databases, from the first device to the second device during initialization of synchronization and a second update identifier, which is defined by the first device and describes the present synchronization, store said second update identifier, and update the contents of the first update identifiers stored in the devices with the contents of said second update identifier if synchronization has been performed and after this said transport layer connection has been ended substantially properly.

8. A synchronization system according to claim 7, wherein the second device is arranged to compare the first update identifier received with the first update identifier stored in the second device, the first and the second device are arranged to perform synchronization in the requested manner if the first received update identifier corresponds to the first stored update identifier, or the first device and the second device are arranged to synchronize all data units of the databases if the first received update identifier does not correspond to the first stored update identifier.

9. A telecommunications device comprising means for establishing a transport layer connection to at least one other device for synchronizing databases, means for transmitting a first update identifier and a second update identifier defined by said telecommunications device to the other device during initialization of synchronization, the first update identifier being stored at least in said telecommunications device and describing the latest synchronization event said telecommunications device and the other device have performed in the databases, and said second update identifier describing the present synchronization, means for storing said second update identifier, and means for updating the contents of the first update identifier stored in said telecommunications device with the contents of said second update identifier if synchronization has been performed and after this said transport layer connection has been ended substantially properly.

10. A synchronization device comprising means for establishing a transport layer connection to at least one other device for synchronizing databases, means for receiving a first update identifier and a second update identifier from the other device during initialization of synchronization, the first update identifier describing the latest synchronization event said synchronization device and the other device have performed in the databases, and the second update identifier describing the present synchronization, means for storing said second update identifier, and means for updating the first update identifier with the contents of said second update identifier if synchronization has been performed and after this said transport layer connection has been ended substantially properly.

11. A synchronization device according to claim 10, which also comprises means for comparing the first update identifier received with the first update identifier stored in said synchronization device, means for performing synchronization in the manner requested by the other device if the first received update identifier corresponds to the first stored update identifier, and means for synchronizing data units of all databases if the first received update identifier does not correspond to the first stored update identifier.

12. A computer program product loadable into the memory of a telecommunications device and comprising a code which is executable in the telecommunications device making the telecommunications device establish a transport layer connection to at least one other device for synchronizing databases, transmit a first update identifier and a second update identifier defined by said telecommunications device to the other device during initialization of synchronization, the first update identifier being stored at least in said telecommunications device and describing the latest synchronization event said telecommunications device and the other device have performed in the databases, and said second update identifier describing the present synchronization, store said second update identifier, and update the contents of the first update identifier stored in said telecommunications device with the contents of said second update identifier if synchronization has been performed and after this said transport layer connection has been ended substantially properly.

13. A computer program product loadable into the memory of a computer functioning as a synchronization device and comprising a code which is executable in the synchronization device making the synchronization device establish a transport layer connection to at least one other device for synchronizing databases, receive a first update identifier and a second update identifier from the other device during initialization of synchronization, the first update identifier describing the latest synchronization event said synchronization device and the other device have performed in the databases, and the second update identifier describing the present synchronization, store the second update identifier, and update the contents of the first update identifier stored in said synchronization device with the contents of said second update identifier if synchronization has been performed and after this said transport layer connection has been ended substantially properly.

* * * * *